(12) United States Patent
Bennett et al.

(10) Patent No.: US 9,769,276 B2
(45) Date of Patent: *Sep. 19, 2017

(54) REAL-TIME NETWORK MONITORING AND SECURITY

(71) Applicant: BAE SYSTEMS plc, London (GB)

(72) Inventors: Mark Arwyn Bennett, Surrey (GB); Alexander Colin Piggott, Surrey (GB); David John Michael Garfield, London (GB); Philip Morris, Surrey (GB)

(73) Assignee: BAE SYSTEMS PLC, London (GB)

( * ) Notice: Subject to any disclaimer, the term of this patent is extended or adjusted under 35 U.S.C. 154(b) by 36 days.

This patent is subject to a terminal disclaimer.

(21) Appl. No.: 14/624,010

(22) Filed: Feb. 17, 2015

(65) Prior Publication Data

US 2015/0163319 A1 Jun. 11, 2015

Related U.S. Application Data

(63) Continuation of application No. 13/719,736, filed on Dec. 19, 2012, now Pat. No. 8,977,744, which is a (Continued)

(30) Foreign Application Priority Data

Sep. 11, 2003 (EP) ..................... 03255686

(51) Int. Cl.
*H04L 29/08* (2006.01)
*H04L 29/06* (2006.01)
(Continued)

(52) U.S. Cl.
CPC ...... *H04L 67/2842* (2013.01); *G06F 11/3048* (2013.01); *G06F 17/30864* (2013.01);
(Continued)

(58) Field of Classification Search
CPC . H04L 67/2842; H04L 63/0245; H04L 63/22; H04L 63/145; H04L 69/22;
(Continued)

(56) References Cited

U.S. PATENT DOCUMENTS 4,482,927 A 11/1984 Melbye et al.
5,414,833 A 5/1995 Hershey et al.
(Continued)

OTHER PUBLICATIONS

Lockwood, John. "Extensible Network Security Device Built with the Amplify Solution," The Syndicated, pp. 1-2, 2003.
(Continued)

*Primary Examiner* — William Goodchild
(74) *Attorney, Agent, or Firm* — Scully, Scott, Murphy & Presser, P.C.

(57) ABSTRACT

A hardware device for monitoring and intercepting data packetized data traffic at full line rate, is proved. In high bandwidth embodiments, full line rate corresponds to rates that exceed 100 Mbytes/s and in some cases 1000 Mbytes/s. Monitoring and intercepting software, alone, is not able to operate on such volumes of data in real-time. An exemplary embodiment comprises: a data delay buffer with multiple delay outputs; a search engine logic for implementing a set of basic search tools that operate in real-time on the data traffic; a programmable gate array; an interface for passing data quickly to software sub-systems; and control means for implementing software control of the operation of the search tools. The programmable gate array inserts the data packets into the delay buffer, extracts them for searching at the delay outputs and formats and schedules the operation of the search engine logic.

14 Claims, 6 Drawing Sheets

Related U.S. Application Data continuation of application No. 10/937,540, filed on Sep. 10, 2004, now Pat. No. 8,364,833.

(51) Int. Cl.
*G06F 11/30* (2006.01)
*G06F 17/30* (2006.01)

(52) U.S. Cl.
CPC ........ H04L 63/0245 (2013.01); H04L 63/145 (2013.01); H04L 69/22 (2013.01)

(58) Field of Classification Search
CPC ......... H04L 12/26; H04L 12/02; H04L 12/00; H04L 12/2602; H04L 12/2642; H04L 12/2692; H04L 12/2818; H04L 41/0253; H04L 43/00; H04L 43/08; H04L 43/0876; H04L 43/10; H04L 47/10; H04L 47/11; H04L 47/20; H04L 67/025; H04L 67/22; H04L 67/42; G06F 11/3048; G06F 17/30864
USPC ......................................................... 709/224
See application file for complete search history.

(56) References Cited

U.S. PATENT DOCUMENTS

| | | | |
|---|---|---|---|
| 5,623,600 | A | 4/1997 | Ji et al. |
| 6,233,589 | B1 | 5/2001 | Balcha et al. |
| 6,598,034 | B1 | 7/2003 | Kloth |
| 6,938,166 | B1 | 8/2005 | Sarfati et al. |
| 2003/0145228 | A1 | 7/2003 | Suuronen et al. |
| 2004/0003284 | A1* | 1/2004 | Campbell ............. G06F 21/562 726/24 |
| 2004/0012989 | A1 | 1/2004 | Park et al. |
| 2005/0086499 | A1 | 4/2005 | Hoefelmeyer et al. |

OTHER PUBLICATIONS

Bollano, G. et al. "Merging Hardware and Software: Intellectual Property Cores for Internet Applications," Custom Integrated Circuits Conference, pp. 537-540, 2000.

Curtin, Patrick et al."CAMS in Packet Classification: Can Fully Algorithmic Solutions Still Compete?", Netronics, pp. 54-55, 2001.

Extended European Search Report issued Sep. 22, 2011 for corresponding European Application No. 10012028.6.

European Patent Office, "Communication with European Search Report," issued in connection with European Patent Application No. 03255686.2, dated Mar. 3, 2004.

Moscola et al., "Implementation of a content-scanning module for an Internet firewall," Field-Programmable Custom Computing Machines, 2003. FCCM 2003. 11th Annual IEEE Symposium on Apr. 9-11, 2003 pp. 31-38.

Moscola et al., "FPsed: a streaming content search-and-replace module for an Internet Firewall," High Performance Interconnects, 2003. Proceedings. 11th Symposium on Aug. 20-22, 2003 pp. 122-129.

U.S. Office Action dated Nov. 10, 2008 of related U.S. Appl. No. 10/937,540.

U.S. Office Action dated May 27, 2009 of related U.S. Appl. No. 10/937,540.

U.S. Office Action dated Jun. 4, 2012 of related U.S. Appl. No. 10/937,540.

U.S. Office Action dated Sep. 16, 2013 of related U.S. Appl. No. 13/719,736.

U.S. Office Action dated Apr. 22, 2014 of related U.S. Appl. No. 13/719,736.

\* cited by examiner

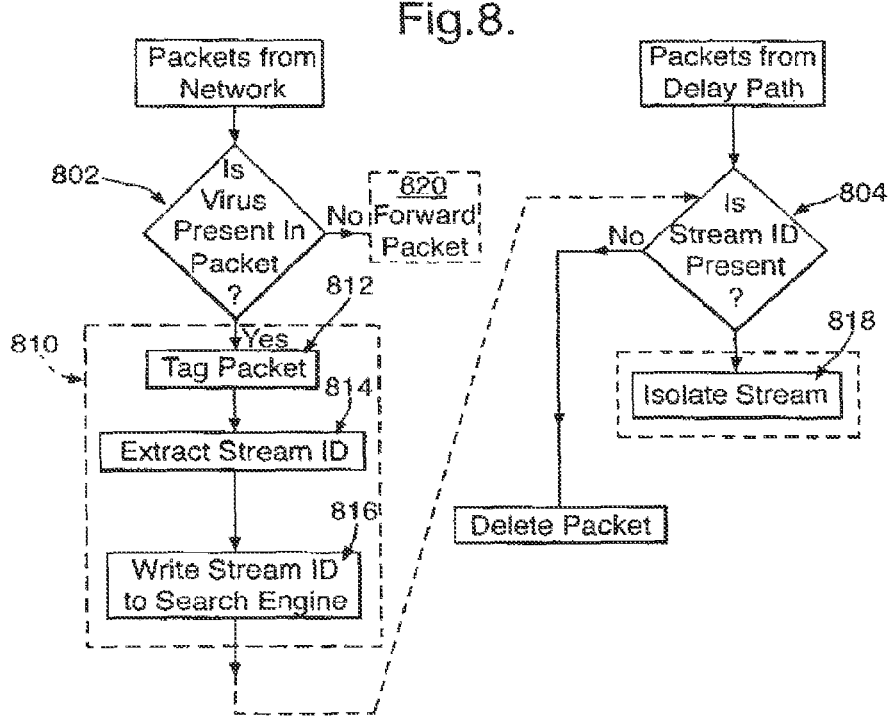
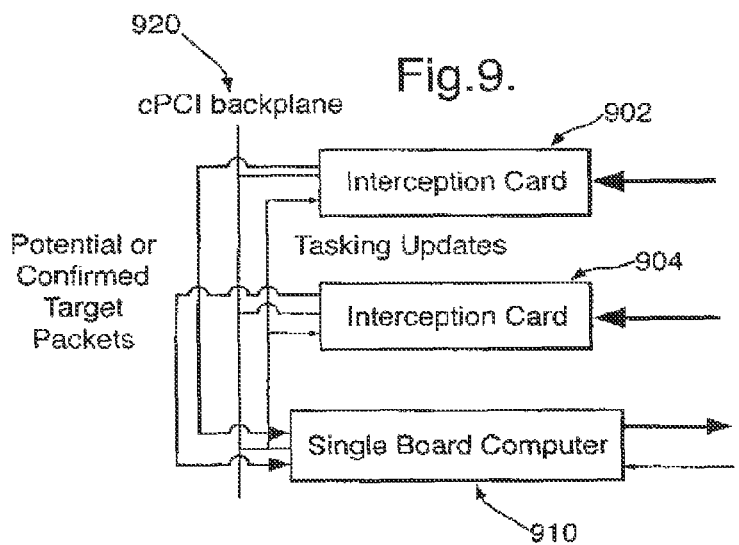

REAL-TIME NETWORK MONITORING AND SECURITY

CROSS-REFERENCE TO RELATED PATENT APPLICATION

This application is a continuation of U.S. patent application Ser. No. 13/719,736, filed Dec. 19, 2012 which is a continuation of U.S. patent application Ser. No. 10/937,540, filed Sep. 10, 2004, which claims priority to European Patent Application No. 03255686.2, filed Sep. 11, 2003. The disclosures of the prior applications are hereby incorporated in their entireties by reference.

FIELD OF THE INVENTION

The present invention relates to the monitoring of network data traffic in real-time. In particular, the present invention relates to apparatus for the real-time monitoring and processing of internet protocol (IP) packets at very high data rates to enable a range of data monitoring and real-time network security applications.

BACKGROUND OF THE INVENTION

The relentless increase in data traffic over distributed networks has engendered a concomitant requirement for monitoring and filtering the data passing over such networks. Whether the distributed network is a local area network (LAN), a metropolitan area network (MAN), or a wide area network (WAN) that spans an entire continent, the monitoring and filtering tasks are conventionally carried out either in hardware, using dedicated application specific integrated circuits (ASICs), or in software, running on processing devices hosting server software. In the latter case, the processing devices may in fact be network servers-computers one of whose programmed tasks is to operate server software within a particular LAN or WAN. Alternatively, they may be dedicated devices that run only network software, so-called "network appliances". It will be understood that the term "server" is used in the literature to denote both the physical processing devices and the server software they host. Where a distinction is not made between these meanings in the following text, the term refers to both simultaneously.

Typically, a range of monitoring and filtering tasks are performed at various points throughout distributed networks in order to protect servers and/or their clients from unwanted data. Indeed, the routing strategies adopted by routers may be considered as fulfilling a basic filtering task. There are many software applications, executed by servers themselves, that implement monitoring and/or filtering tasks. An important subset of these applications deals primarily with potential threats to the integrity of the network or the information transmitted over it: they are generally referred to as security software applications or simply "security elements".

Examples of existing internet security software applications for execution on servers include: antivirus (AV) detection software; spam detection software; content monitoring software; firewall software; traffic sniffing software, anti-fraud software; and, intrusion detection and prevention software.

Servers can either be owned and operated by business or residential users, or provided as "managed security services" by a service provider, for example a telecommunications operator, a communications service provider (CSP) or an internet service provider (ISP). In the case of a managed security service, the service provider may incorporate one or more security elements in their service offering. This may be done by placing appropriately configured servers on the customer premises or by providing the security element in their own servers at a data centre. Service providers typically supply either an all-purpose network server or a dedicated network appliance for each group of one or more customers; a separate piece of server software processing data traffic for each security element offered. In addition, the service provider will generally deploy additional servers within their own network to provide internal security and to prevent attacks on their own network infrastructure.

Software security systems that enable the monitoring and controlling of data traffic in packet-oriented networks are known. Examples of security systems used with the ubiquitous TCP/IP protocol suite include firewall applications, AV software, and intrusion detection software, such as so-called "sniffer" software.

Firewall applications include a packet inspection functionality which allows content-aware filtering of the packets passing into a sub-network, for example allowing only certain FTP (file transfer protocol) commands to be used or blocking encrypted data traffic over a given port.

An ISP may provide AV software configured to be applied to email traffic in their mail service offering. AV software monitors the email traffic for data patterns that correspond to a regularly updated list of "virus signatures". Virus signatures are patterns of data that identify potentially malicious executable code.

Sniffer software can be used to monitor and log the activity of a predetermined network user, thereby allowing a network administrator to detect abusive or suspicious network activity.

Such software solutions are fundamentally limited by the capacity of servers to receive, process in software, and retransmit monitored data onto a network quickly enough, while avoiding the introduction of large delays (latency) or missing data packets entirely. Where large numbers of subscribers are offered managed security services (as they would be in, for example, a residential service or a service aimed at small/medium sized enterprises) or where high traffic loads (input bit rates of 100 Mbytes/s or more) are carried on large networks, the software approach runs up against these constraints. Conventionally, this problem can be addressed by deploying additional servers in conjunction with (hardware) network switches that distribute the traffic load between available servers. This solution comes at cost in terms of: complexity; administration and management overheads; physical infrastructure space required for the network and attached devices; and, often crucially, in terms of financial outlay.

Conventional processing and monitoring devices, such as those used for processing IP data traffic, include a hardware network switch and a processing device. In operation, the processing device executes software servers; each software server offering the functionality of a security element to one or more users.

Real-time interception of network traffic is distributed amongst the software servers so that each software server hosts a security element functionality on behalf of a predetermined group of users.

Prior art systems do not cope effectively with high bandwidth data traffic, as might be found in the core networks of ISPs and CSPs. Examples of communications standards exhibiting input rates that are considered to be high bandwidth include: STM-64 (1244 Mbytes/s); STM-16 (311

Mbytes/s); 10 Gigabit Ethernet (1250 Mbytes/s LAN mode, else as STM-64); and Gigabit Ethernet (125 Mbytes/s).

A hardware platform is able to handle these high bandwidth input rates. Conventional hardware platforms, however, replace each required security element with corresponding, dedicated (often custom built) ASIC components.

Such devices have typically been built to perform specific protocol processing tasks. The major disadvantage of known custom built hardware devices is their static functionality. This arrangement, while capable of handling the data traffic at full line rate, is not easily adaptable or upgradable. This means that they are complex, risky and time-consuming to build, update and maintain. Furthermore, the inherent difficulty of constructing firmware or hardware analogous to "real-time" security software applications means that there are relatively few appropriate developers.

A more recent approach has been to provide an ASIC that includes a field programmable gate array (FPGA) with dynamically programmable logic. To achieve the dynamic programming either a language such as VHDL is used or a programmable finite state machine (FSM) is instigated.

Where VHDL and similar languages are used the drawback has been that the developer community is small, and that programming and particularly debugging applications has been found very difficult. By contrast, the problem with FSMs is that, while they might be easy to program, the functionality it is possible to implement using them is very restricted compared to the versatility of programming languages: attempts to extend the functionality have resulted in unmaintainable code.

STATEMENT OF INVENTION

According to one aspect of the present invention there is provided an apparatus for detecting a predetermined bit pattern in data traffic comprising a plurality of data packets, the data packets having a header portion and a payload portion, the apparatus comprising:

a processing logic for receiving the data traffic in real-time and for dividing the data packets in the data traffic into bit sequences; and an Internet Protocol (IP) co-processor unit having a bit pattern storage memory array, in which one or more predetermined bit patterns are stored, the IP co-processor unit comprising means for identifying, from within at least the payload portion, each data packet that contains a bit sequence that matches a predetermined bit pattern entry within the memory array.

Rather than use dedicated ASICs, the invention makes use of more general purpose hardware components for performing searches of data traffic for occurrences of specific bit patterns: and in particular, an IP co-processor. In this aspect of the invention, one or more IP co-processors are used to provide content addressable memory (CAM) arrays that are suitably fast at performing basic comparison tasks. Not only are IP co-processors capable of high comparison rates, they are also arranged so that the "selectors", i.e. the terms for which the device searches, can be altered, added, and deleted under software control.

The bit pattern storage memory array may store bit patterns as ternary data. As a result, the IP co-processor can be arranged to match bit patterns of variable lengths. The matching of alphabetic characters can be made 'case insensitive': for instance, ASCII differentiates between cases by changing one bit of the ASCII character code and when searching for a bit pattern in any fixed length ASCII character the 'case' bit can be represented by an 'X' for "don't care". Furthermore, by using the 'X' state to represent a 'wildcard', many bit patterns can be searched in one comparison: so-called "selector compression".

In certain circumstances, the bit sequences supplied to the IP co-processor unit may be consecutive sequences of bits from a single data packet. To match patterns across packet boundaries, at least one of the predetermined bit patterns would preferably comprise two subpatterns, the at least one bit pattern having a length L bits, each subpattern being stored as a separate bit pattern entry in the memory array; the identifying means would compare the subpatterns with bit sequences from an end portion of each data packet, the portion being within L bits of the beginning or of the end of the data packet; and the identifying means would identify each data packet that contains a bit sequence that matches one or other of the two subpatterns.

The apparatus preferably further comprises a control interface, the control interface being in communication with the processing logic, the interface conveying software instructions to the processing logic to alter the bit pattern entries in the IP co-processor unit. The alteration may be an addition or a modification of a given entry (selector) in the bit pattern storage memory array and the IP co-processor unit is thereby configured to search for a new bit pattern. Alternatively, the alteration is a deletion of one or more pattern storage array entries, with the result that the search engine logic no longer searches for the or each deleted bit pattern.

Advantageously, the control interface is integral with the processing logic. Through this control interface, software applications can adapt the bit pattern search functionality of the IP co-processor unit.

The bit pattern storage memory array of the IP co-processor unit may include a plurality of bit offset entries corresponding to one or more predetermined bit patterns. Provided there are sufficient unused locations in the bit pattern storage memory array, multiple bit-offset entries will permit a higher rate of data packet throughput in the IP co-processor unit. A special case of this would be an eight-bit offset (or byte offset).

Another way to extend the number of selectors is to provide additional IP co-processor units, each with their respective bit pattern storage memory arrays.

The apparatus preferably further comprises at least one further IP co-processor unit, the or each further IP co-processor unit operating upon bit sequences having a predetermined offset relative to the bit sequences searched by the IP co-processor unit. Successively offset versions of the same data packet are thereby compared against each selector in the selector table stored on each bit pattern storage memory array.

Advantageously, the or each further IP co-processor unit is provided with an identical copy of the contents of the bit pattern storage memory array of the IP co-processor unit.

It is preferred that the apparatus further comprises a delay buffer for storing the data traffic at full line rate, wherein data streams that contain a data packet that is identified as having a bit sequence that matches the predetermined bit pattern are extracted from an output of the delay buffer and passed to a software application for further processing.

In preferred high bandwidth embodiments, full line rate corresponds to bit rates that exceed 100 Mbytes/s (in fact, often by a factor of 10 or more).

In accordance with a further aspect of the invention, there is provided an apparatus for detecting a predetermined bit pattern in data traffic comprising a plurality of data streams of data packets, the apparatus comprising:

a processing logic for receiving the data traffic in real-time and for dividing the data traffic into bit sequences;

a search engine logic having a bit pattern storage memory array, in which one or more predetermined bit patterns are stored, the search engine logic comprising means for identifying each data packet that contains a bit sequence that matches a predetermined bit pattern entry within the memory array; and a delay buffer for storing the data traffic at full line rate, the delay buffer having one or more outputs, wherein data streams that contain a data packet that is identified as having a bit sequence that matches a predetermined bit pattern are extracted from an output of the delay buffer and passed to a software application for further processing.

Again, the invention makes use of more general purpose hardware components for performing searches of data traffic for occurrences of specific bit patterns. In this aspect of the invention, a delay buffer creates a delay path that holds all data traffic for a length of time determined by the operation of the, or each, delay output and by the total capacity of the buffer.

In this case, it is advantageous that the memory capacity of the delay buffer is sufficient to retain the full bandwidth of the data traffic for a period of seconds. In preferred high bandwidth embodiments, full line rate corresponds to bit rates that exceed 100 Mbytes/s (in fact, often by a factor of 10 or more).

The provision of such a significant amount of memory for use as a buffer adds desirable functionality, including allowing further searches and combination searches of data traffic. The presence of several delay outputs of different durations enables software modules to trade-off latency vs prior amount of data available for processing.

An actionable data packet may occur at any point in a data stream. The delay buffer permits the storage of a significant proportion of the packets in an data stream so that if a later data packet is found to be actionable, data packets belonging to the same data stream can be identified by further searches of the data exiting at one or more of the delay outputs. Consequently, once a data packet belonging to a data stream is identified as possibly actionable (by virtue of a match of a bit sequence in the data packet with the predetermined bit pattern), any data packets belonging to the same data stream, even if they were transmitted before the actionable data packet, can be identified (by virtue of a subsequent match of a further bit sequence, for instance an address in the header field) and forwarded, along with the actionable packet and any further packets belonging to the same data stream, to software for further processing.

The search engine logic advantageously comprises means for performing a protocol based search, in which target data packets are identified by virtue of the bit sequence of at least one data field within each data packet. The data field may be a header field, the header field including data relating to one of the group including: address information; to/from port number information; and, packet type identifier information.

The protocol based search is advantageously a search on IP header fields. Data packets having IP address information that matches the predetermined bit pattern can therefore be flagged and software security applications can then act upon sets of data packets representing whole email messages or data files containing computer viruses.

Search engine logic can make use of hash-table technologies but it is preferred that the device use CAM instead. It is consequently preferred that the search engine logic is an IP co-processor unit: IP co-processor units incorporate CAM.

In accordance with yet another aspect of the invention, there is provided a system for detecting a predetermined bit pattern in input data traffic comprising a plurality of data packets, the system comprising a hardware component and a software component, the hardware component including:

a processing logic for receiving the data traffic in real-time and for dividing the data traffic into bit sequences; and a search engine logic having a bit pattern storage memory array, in which one or more predetermined bit patterns are stored, the search engine logic comprising means for identifying each data packet that contains a bit sequence that matches the predetermined bit pattern entry within the memory array, wherein data packets processed by the search engine logic of the hardware component and identified as containing a matching bit sequence are passed to an executable software application of the software component for further processing, the bandwidth of data traffic passed on to the executable software application of the software component being substantially less than the bandwidth of the data traffic input into the hardware component.

Hardware components are thus used to narrow down the bandwidth of data traffic so that software components need only operate on a restricted subset of the data packets in the overall data traffic. Consequently, the search functionality is split into repetitive tasks that can be defined in simple terms (and performed fast by hardware components) and more computationally intensive tasks that involve more complex definition (and therefore more conveniently executed by software at a slower rate).

The hardware component is capable of performing processing and data packet filtering at input rates too high to be achieved purely in software. It is also adaptable to changes in operational environment and relatively straightforward to upgrade. In particular, data packet selection may be dynamically programmed from software to implement an arbitrary number of filters, including, for example, combinations of TCP/IP payload bit pattern searches and TCP/IP header look-ups.

The comparison performed in the hardware search engine logic replaces similar comparison functionality previously performed in software. Software security applications are thereby freed to act upon matches found by the hardware search engine. The present invention therefore allows a wide range of security elements to be provided on a single network device, even when the number of subscribers is large or the traffic loads are very high. By monitoring and intercepting the data traffic in real-time using hardware, it substantially obviates the scalability and latency problems of the conventional software-only, server-based approach.

By permitting the real-time processing and interception of data traffic, the system allows data traffic to be processed to remove unwanted, dangerous or illicit content before this content reaches any customer's premises.

Preferably, the search engine logic of the hardware component is an IP co-processor unit.

It is preferred that the hardware component of the system further comprises a delay buffer for storing the data traffic at full line rate, wherein data streams that contain a data packet that is identified as having a bit sequence that matches the predetermined bit pattern are extracted from an output of the delay buffer and passed to a software application for further processing.

The processing logic is preferably programmable in a higher level programming language.

Higher level programming languages are generally easier to programme than languages like ASSEMBLY, FSM or firmware. They are also easier to maintain.

As the hardware component can be arranged to output data in a standardised, application independent format (for example using a small suite of API calls), high speed monitoring applications (e.g. anti-virus applications) can be developed without requiring extra code to be written to handle the output. In combination with the hardware component, these monitoring applications can operate on data at bandwidths too high for software applications on their own to handle. Furthermore, as the software developer will appreciate, by providing a suitable 'front end' interface, the system can be arranged to use off-the-shelf monitoring applications.

The hardware component can thereby detect the presence of a signature bit pattern, such as a virus signature, wherever in the data packet that signature might appear, generate application independent output, and pass that output to the software component. The software component can then retask the hardware component to search for, and optionally intercept, related data packets.

The apparatus can therefore implement bit pattern detection functionality for the full range of security elements found in software-based systems. However, since it operates in real-time, analysing data packets as they travel over the network, the system can provide additional security elements traditionally not found in server-based systems.

The combination of a free form search with a subsequent header field search is particularly advantageous. In the free form search, the search engine detects instances of data packets that contain a match for a first bit pattern. These instances are analysed to discover information that identifies the network transaction to which the instances belong. The identification information is then used to generate a second bit pattern that corresponds to the contents of the header field of any data packets belonging to the identified network transaction. In the subsequent header field search, the search engine is then instructed to search through data output from the delay buffer for data packets containing the second bit pattern. All packets containing the second bit pattern are then fed to software applications for further processing.

In this combination of searches, the search engine logic of the hardware component, performing a free form search for the first bit pattern, operates as a "coarse filter" such that only a small fraction of network transactions (sessions comprising one or more data packets related by their content or the fields in their protocol headers) that may contain actionable content is passed to the software component.

The combination of signature and header will usually define both the threat and the service/protocol. Therefore, many software modules covering a wide range of threats and protocols may run concurrently without impacting the overall system performance (because only a small number, eg 1, will be operating on a given filtered data packet at any one time).

BRIEF DESCRIPTION OF THE DRAWINGS

Examples of the present invention will now be described in detail with reference to the accompanying drawings, in which:

FIG. 8 is a flowchart illustrating how the apparatus operates to detect virus signatures; and FIG. 9 shows an example of a system architecture including two interception cards.

DETAILED DESCRIPTION

Figure 1A:
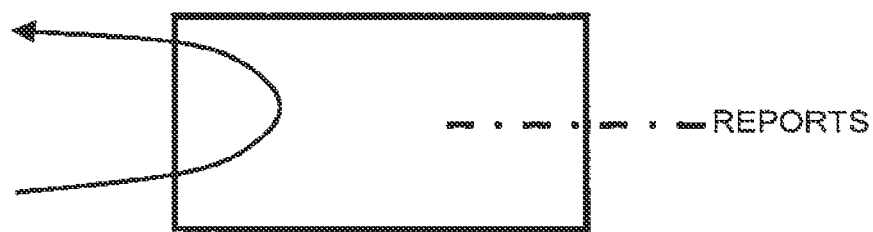
FIG. 1A shows an active configuration of a device in accordance with the invention.
Figure 1B:
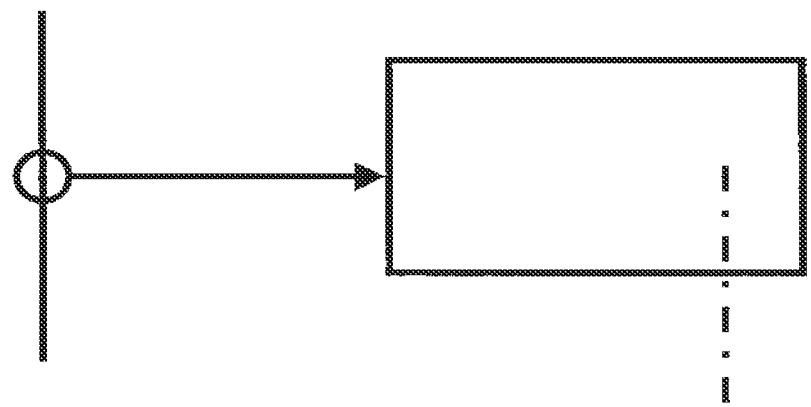
FIG. 1B shows a passive configuration of a device in accordance with the invention.

The invention can be implemented in a network in two configurations: an active configuration and a passive configuration. The active configuration (shown in FIG. 1A) not only monitors and filters data but performs all the tasks of a conventional router-storing and forwarding data packets. The passive configuration (shown in FIG. 1B) performs no routing functions, but may be arranged to forward a copy of any suspect packages to a specific node on the network.

The passive configuration can be characterised as providing data packet sniffing applications, where wanted 'target' data packets are output from software. The active configuration allows 'safe' data packets to be streamed to their destination, and is suited to streaming applications, such as real-time AV.

In an embodiment of the present invention, the apparatus is implemented as hardware logic units in a network device that also includes switching apparatus, for conventional network switching tasks. The hardware logic units are arranged to provide output that is substantially independent of the software applications that use that output. Consequently, the hardware platform can provide data for a range of different applications without need for format conversion.

The hardware logic units thus perform, in real-time and at full line rate, the monitoring and processing functions conventionally carried out by software servers. More precisely, the real-time approach involves providing, in a dedicated hardware search engine logic, the bit pattern detection functionality that has conventionally formed part of security software applications implemented in server software (e.g. looking for virus signatures). The hardware search engine logic is provided as a component of the hardware logic units. The real-time checking path of the apparatus is implemented by the passage of the incoming data packets through the search engine logic.

Figure 2:
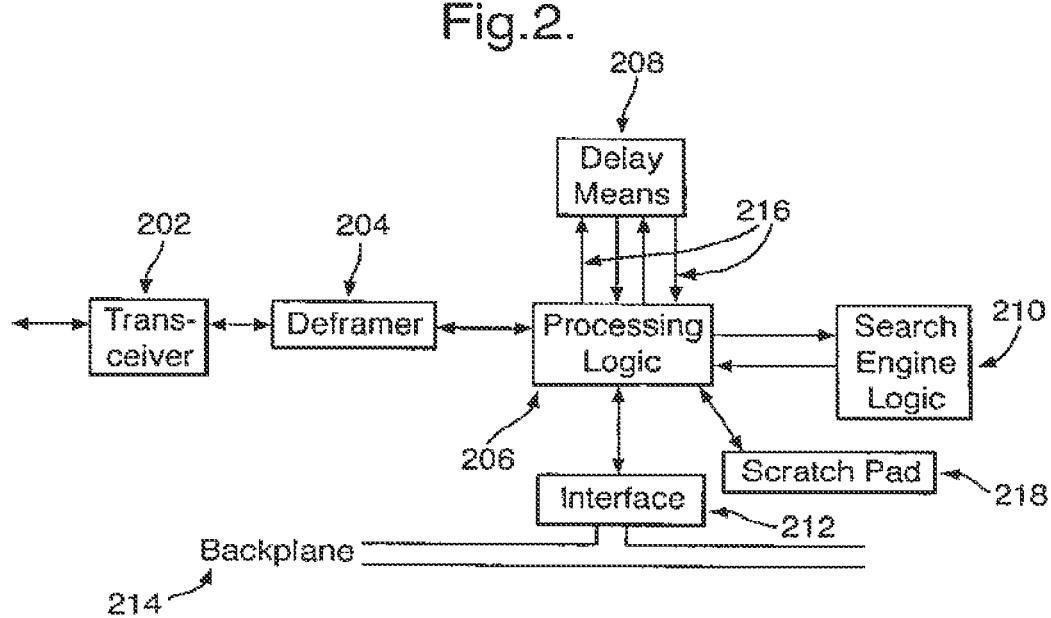
FIG. 2 shows a more detailed schematic diagram of the components in an apparatus according to the present invention.

A suitable arrangement of hardware logic units in accordance with this embodiment of the invention is illustrated schematically in FIG. 2. Data enters the device at full line rate via a standard line interface unit 202 and a framer/deframer 204. The hardware logic units comprise: a search engine logic 210 for implementing a set of basic search tools that operate in real-time on data packetized data traffic; an interface component 212 for passing data quickly to software sub-systems; and a processing logic 206 for implementing software control of the operation of the search tools.

The search engine logic 210 can be implemented: as a hash-table search; using a hardware correlation engine; or by using a CAM (content addressable memory).

In a preferred implementation of the invention, an IP co-processor is used as the search engine logic. To understand why IP co-processors are suited to this task, one must consider the task for which IP co-processors are intended: routing in data packet-oriented networks.

An intrinsic component of any data packet-oriented network is the switch or router. This ensures that data packets are correctly sent to their destinations. Data packets within data packet-oriented networks generally have both header and payload portions. The header portion includes fields for storing: package number, destination address information, port numbers and protocol fields. The payload portion contains a block of data for transmission across the network.

Routers store each data packet temporarily (in a queue), inspect the destination address field, then forward the data packet to the destination (or another router) according to a routing strategy. No network can carry data traffic at a higher rate than the rate at which the router can repeat this process. In order to maximise data throughput, the hardware components of routers are continually improved: to increase the volume of data stored; to accelerate the address inspection and forwarding steps; and to streamline the routing strategy. A particularly important component in this respect is the IP co-processor, which is specifically designed for use in routers for WANs that implement the TCP/IP protocol suite.

The fact that a data packet-switched network can not function at line rates that exceed the capabilities of the routers in that network means that there will always be a router component capable of storing, processing and forwarding data packets at the maximum line rate. IP co-processor chipsets currently fulfil this criterion. Furthermore, suitable IP co-processor chipsets are readily available as off-the-shelf items.

IP co-processor chipsets, such as the IDT® Network Search Engine devices, integrate suitably large arrays of CAM. These chipsets can be instructed to compare a data structure (temporarily stored in a register) with one or more entries in the CAM array ("lookup"). In addition, new entries can be written into an unused location in the array ("learn"), thereby facilitating searches for the new entries.

In this preferred implementation, the IP co-processor provides the search functionality necessary to facilitate a range of security elements found in software-based systems, for example, firewall, intrusion detection and prevention, anti-virus for Internet email and FTP file downloading, spam filtering, and URL filtering. However, since it operates in real-time, analysing data packets as they travel over the network, apparatus incorporating IP co-processors can provide additional security elements traditionally not found in server-based systems:

Anti-virus for all email not just email downloaded from the Internet service provider e.g. web mail, mail services offer by other ISPs etc.

Anti-virus protection for real-time network services such as HTTP, instant messaging, voice-over-IP (VoIP).

Chat-room watch guard as a child protection feature: watching the information typed into a chat room service in real-time and preventing personal data (real name, phone number, home address etc.) being sent or logging that personal data has been entered and alerting the child's parents or guardians.

As a parental control feature removal illicit material e.g. blanking out swear words in a web page or email.

The apparatus can also be used to monitor the activities of employees or subscribers on the network. In the case of employees, this might involve identifying which web sites they are visiting and for how long; the content of the emails, downloads, instant messaging, chat rooms and peer-to-peer applications they are using and whether it involves exchanging or downloading illicit or copyright materials; and the details of the other individuals with whom they are communicating. Similarly, for subscribers to an Internet service, this may involve monitoring their activities to make sure they are not violating the terms of their service agreement. The system, if it has identified a potential target, could be used to collect all data packets related to the target as evidence for employee dismissal case or service termination.

As noted previously, IP co-processors are constantly being developed to increase their capacity and IP co-processor capacity fundamentally limits network line rates. IP co-processors are attractive because, whatever the network, there is bound to be an IP co-processor designed to operate at the full line for that network. In other words, IP co-processors are good candidates for implementing a CAM that operates at full line rate because they are available at all achievable line rates.

While initial checking is performed at full line rate and substantially in real-time, subsequent software processing of intercepted content (in the separate sub-system) may require more time. By ensuring that all data traffic remains accessible for as long as it is needed, processing can be carried out at a rate that the software can handle efficiently, even if that rate is no longer in real-time.

Thus, in another preferred implementation of the invention, the accessibility of data traffic is assured by providing a delay path through the hardware logic units, i.e. a temporary memory, in parallel to the (full line rate) checking path: the duration of storage being sufficiently long to allow the software processing to complete. Meanwhile, data that has not been intercepted can be re-transmitted, from the checking path, with no significant latency. The invention therefore allows data traffic to be processed to remove unwanted, dangerous or illicit content before this content reaches any customer's premises.

In FIG. 2, the hardware logic units also include a data delay buffer 208 with multiple tap points 216. The data delay buffer 208 can be implemented as volatile memory, for example DDR RAM or SRAM. The delay buffer operates as first-in-first-out (FIFO) memory so that for an input data rate of 0.3 Gbytes/s and a requirement of 1.5 seconds of delay, it will therefore suffice to provide 0.5 Gbytes of DDR RAM.

The processing logic 206 may be implemented as one or more network processing units (NPU), ASIC units, field programmable gate arrays (FPGAs) or a combination of such components. The processing logic 206 is arranged to manage the interaction between the other hardware components, between hardware components and software control instructions (thereby mediating control of the operation of the search engine logic 210), and, via the interface component, between the apparatus and connected software sub-systems.

In the light of the discussion of the previous implementation, it is also preferred that IP co-processor chipsets are used to implement CAMs for the present implementation.

The search engine logic 210 and the processing logic 206 cooperate to implement basic search tools of two types:

a) a bit sequence search, which allows bit patterns to be matched anywhere within the data flowing through the apparatus, even across data packet boundaries; and b) a header field search, which allows data packets to be identified based on the contents of data packet header fields, for instance: IP addresses; to/from port numbers; and protocol fields.

The bit sequence searches are also referred to as 'freeform' (FF) searches. FF searches are significantly more demanding in terms of utilisation of search engine logic, the key requirement in executing FF searches being to perform a bit-wise comparison of the incoming data against a dictionary of wanted bit patterns. IP co-processor chipsets are thus particularly suitable. As a rule, the longer the bit pattern and the larger the dictionary, the better: again, IP co-processor chipsets are seen to provide the flexibility to search on longer bit patterns (for example, allowing searches for 64*1024 (64K) pattern entries of up to 18 bytes in length).

With these search tools, the delay buffer 208 and software interaction, sophisticated protocol (data packet content) processing can be achieved.

In one specific embodiment of the invention, the processing and monitoring apparatus is adapted to operate on IP data traffic. This apparatus is now described in order to illustrate further features of the invention particular to the context of IP network communications. The apparatus of the invention is conveniently manufactured from a combination of custom built hardware and standard computing platforms.

The IP data traffic embodiment follows the architecture illustrated in FIG. 2 and incorporates a combination of hardware components suitable for handling IP data traffic, including the following elements:

a) a standard line interface unit (optical transceiver) 202 and framer/deframer 204 for performing basic input and output (I/O). These are OTS chips configured for router applications, and suitable for handling large bandwidths at full line rate: in one possible implementation, the line interface unit 202 is suitable for SONET/SDH operation. Raw IP data packets (e.g. with the POS-Data packet Over SONET overhead removed) are output by the framer/deframer 204.

b) a plurality of field programmable gate arrays (FPGAs)—the favoured implementation of the processing logic 206 in FIG. 2. The hardware IP processing is handled by two FPGA modules: a memory management FPGA module for inserting the data packets from the framer/deframer 204 into the main delay buffer 208, and extracting them for searching at one or more tap points 216 along the delay path; and, a data packet processing FPGA module, responsible for formatting and scheduling the searching. The data packet processing FPGA module is associated with a so-called "scratch pad" 218, for example a volatile memory device such as an SRAM chip. Data packets are held in the "scratch pad" 218 during the search, and then can be forwarded in a suitable format, discarded, or re-submitted for searching.

c) the delay buffer 208 is provided by at least one volatile memory chip, for example a DDR RAM SODIMM module such as might be used in a laptop computer. Four 1 Gbyte DDR RAM modules would be sufficient for storing three seconds of data traffic at full STM-64 rate, and potentially more in practice (since data traffic is often bursty and 50 percent or less utilisation is common).

d) the search engine logic is implemented as one or more IP co-processors, for example IDT® Network Search Engine devices, for performing the actual searching of IP data packets. In one instance, the IP co-processor can support search entries (also referred to as "selectors") 144 bits (18 bytes) in length and each IP co-processor has a selector table of 65,536 entries, and can perform 100 million matches per second across all of these. At higher rates, four IP co-processors would then be required to handle the 400 million searches/second expected. Each of the four co-processors would, in this case, be provided with the same selector table (i.e. the CAM array stores the same table of entries for which to search); the higher throughput being achieved by running the chipsets in parallel for speed.

e) finally, the interface component 212 is conveniently provided by an Peripheral Component Interconnect (PCI) interface. The PCI interface component 212 provides high bandwidth direct memory access (DMA) scatter-gather egress to software sub-systems, via a PCI backplane 214. It is also used for notifying of events (via interrupts), and accepting new tasking. The PCI interface may either be provided as an integrated component within the firmware of the processing logic 206 or as a separate hardware "bridge" unit with direct communication to an interface controller component of the processing logic. A preferred interface standard is the Compact Peripheral Component Interconnect (cPCI), a hardware interconnection standard that has been specially developed for telecommunications and telephony applications. cPCI devices are manufactured to operate at high data rates, to have high reliability and to permit hot-swapping. The apparatus of the present invention may suitably be implemented as one or more cPCI cards, thereby providing high-speed IP interception and filtering in a low form factor standard interface format (i.e. single slot cPCI).

In this IP-specific embodiment, the inventive processing apparatus facilitates real-time application layer processing of high bandwidth IP streams. Furthermore, the apparatus can screen this high bandwidth IP data traffic for content-based threats at full line rate.

Apart from the benefits of the searching operations, the invention benefits from the use of a delay buffer with multiple taps. The delay buffer allows for a number of latencies, including: the time taken for the hardware to interrupt the software; the time required for the software to process the incoming data packet, and retask the hardware; as well as LAN or WAN delays when remote tasking is performed.

Interrupt delays will almost always be less than 5 milliseconds, even on general purpose operating systems. With real-time extensions, the latency will be less than 50 microseconds.

Network delays will obviously depend on the characteristics of the link: from less than a millisecond for a fast point-to-point connection, to over 100 milliseconds for a WAN connection over a satellite link.

The size of the delay buffer and its tap points can be chosen to minimise latency (if required) while ensuring that there is sufficient time for the hardware components to interact with the software components.

The simplest example of this interaction between software and hardware is discussed above: a free form search followed by the detection of other data packets in an IP stream by retasking the search engine logic to search the output of the delay buffer for an IPQ. Even this example conveys some of the power and versatility of the apparatus of the invention.

In another preferred embodiment, the presence of two or more outputs from the delay buffer allows more complex search strategies to be constructed in parallel and/or in series with the application of successive search processes. For example, free form searches for different predetermined bit patterns (different virus signatures, say). can be combined, giving "qualified" search strategies of a type "<signature_1 >AND NOT (<signature_2>AND <signature_3>)". Only data packets that match the combination will cause the software to take the output from the delay buffer to retrieve the rest of an IP stream.

Searches can also be constructed within an IP stream by applying the successive search criteria as the data emerges from the successive taps in the tapped delay line. The search terms used in successive searches need not be predetermined: "<signature_n>" can be changed by software 'on the fly', based on the information found within the data stream from an earlier tap (that is to say, the search engine logic is retasked in dependence upon the result of an earlier search while the data is still present in the delay buffer). Later searches benefit from the results of earlier searches of the same data packets.

To illustrate, consider a suitable delay buffer with three outputs (or "taps") a 'hit' occurs in traffic at tap 1 and at least some of the matched packet(s) are passed to software. The software analyses the packet(s) and decides to place an alternative/additional search on the data in time before it re-emerges at tap 2. The additional search criteria used (for instance, a bit pattern or a header field) can be designated by the software, based on the contents it finds in the analysed packet(s). A new (but related) hit occurs at tap 2 as a result of the new search terms and some further matching packet(s) are passed to software. The software performs further analysis and, if required, sets up yet another search sufficiently early for the data to be scanned yet again (and with a different criteria again) at tap 3.

It is noted that while delay buffers with three outputs as described above are suitable, the delay buffer is not limited to this number of outputs. Different numbers of tap points are provided in further embodiments of the invention. The number of taps does limit the number of searches that can be performed on the same data in series with intervening retasking of the search engine logic.

In a preferred embodiment, the invention may be implemented as a system comprising a hardware component and a software component. Data traffic is received at full line rate (high bandwidth) by the hardware component. The hardware component acts as a coarse filter upon the data traffic, only passing data that fulfils certain criteria to the software component. The software component (a security element, for example) further restricts the data upon which an action needs to be performed.

The data traffic being monitored and filtered comprises a plurality of data packets. Each data packet crossing the apparatus is checked against a set of criteria defined for each security element (for example virus signatures, intrusion/attack signatures, spam signatures, content fields, or IP socket numbers). Whenever a data packet matches the specific criteria, it is passed to a separate sub-system for more detailed analysis, for removal, for quarantine and/or for correction.

The separate sub-system includes a processor that executes the software component of the system. In many instances, the software component is arranged to process the matched data packets and, in consequence, to feedback further bit patterns which may be of interest. Such a combination search facility is of particular use in the detection of streams of data that contain matching bit patterns.

Consequently, the hardware logic units need to perform a number of tasks: adding incoming data packets to the delay path in real-time; screening (filtering) incoming data packets in real-time; passing 'safe' data packets onward with low latency; blocking 'dangerous' data packets and passing them to software; and, updating and managing filtering parameters. Some of these tasks need to be done in hardware, for example filtering, since a bandwidth of, say, 311 Mbytes/s (for STM-16) is too fast for software executing on general purpose computers. Whereas other tasks are better done in software, for example, the update and management of filtering parameters, and deeper inspection of suspicious data packets.

In a further enhancement of the invention, data packets that match one of the criteria are then subjected to a post-selection matching process. The matching data packets are analysed to locate certain suitable fields, these fields can then be 'tagged' for easier recovery by software applications. An example might be the identification of data packets as potential threats followed by a step in which the "to:" field of the data packet is marked for attention. Software applications analysing the potentially threatening data packets can thereby easily locate the 'to:' field in that data packet without requiring any further processing.

Basic hardware search operations are now explained in greater depth, in the context of high bandwidth IP data traffic. For the purposes of this discussion, the apparatus used is the IP-specific apparatus described above, and illustrated with reference to the architecture shown in FIG. 2.

Figure 4:
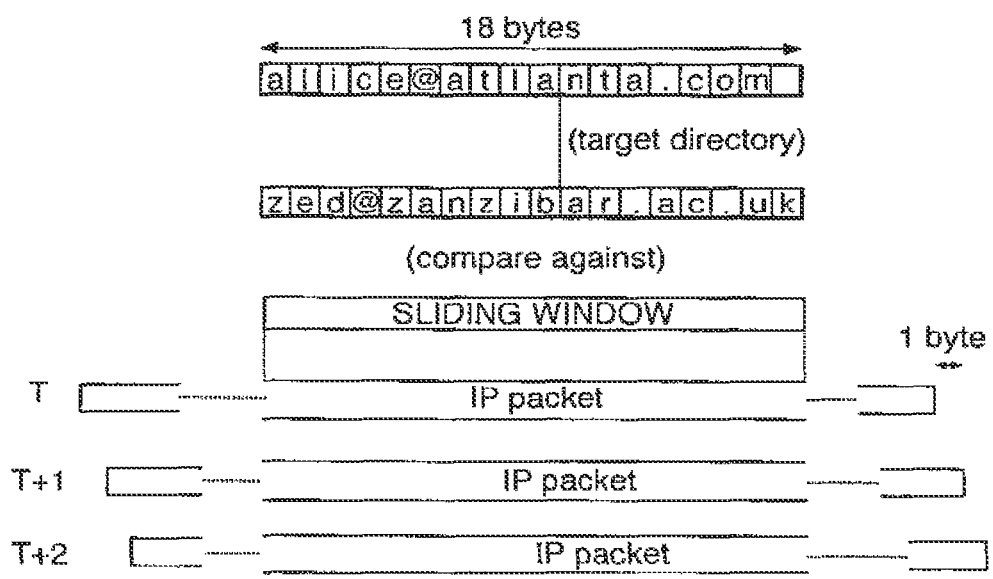
FIG. 4 illustrates the lookup operation implemented upon a search engine logic.
Figure 7:
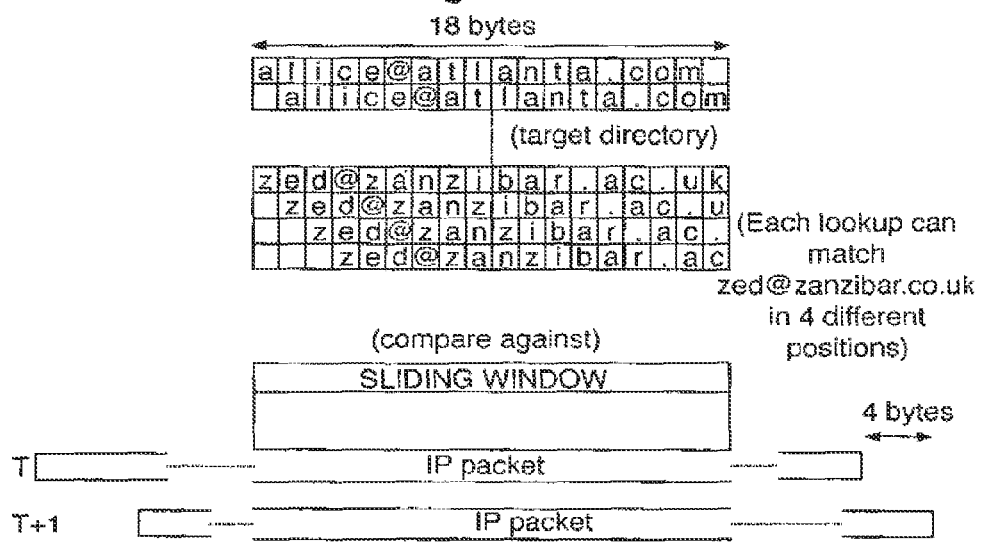
FIG. 7 illustrates an accelerated lookup operation implemented upon either a single search engine logic using a CAM array as shown in FIG. 7 or a set of search engine logics each containing one version of the same selector with successive byte offsets.

The firmware processing logic directs the IP co-processor 210 to perform two generic search operations: matching one or more header field contents of an IP data packet with a selector; and matching a bit pattern at any position within an entire IP data packet (FIGS. 4 and 7). In carrying out either search operation, the IP co-processors allow the storage of selectors in ternary (0, 1 and X, where X is effectively a single bit wildcard indicator).

Figure 3:
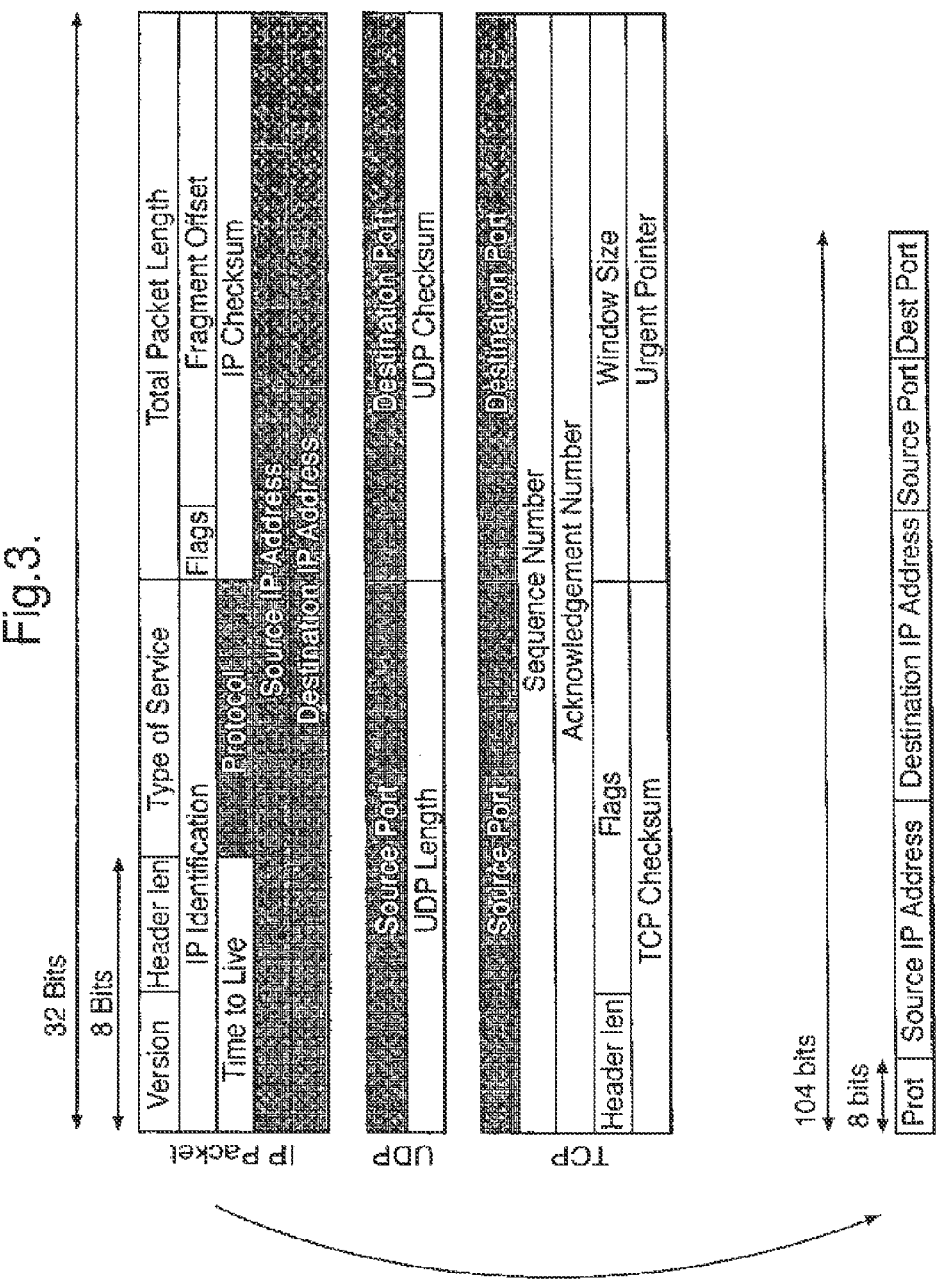
FIG. 3 shows the header fields of a TCP/IP data packet.

In one particular instance of the first type of search operation, the IP co-processor matches a class of selector, referred to as an IP "quint", or simply an IPQ, with the contents of one or more IP header fields. This IP quint comprises the contents of five distinct IP header fields: source and destination IP address (2×32 bits), IP protocol type (e.g. UDP or TCP, 1×8 bits), and UDP/TCP source and destination ports (2×16 bits), giving a total of 104 bits (as shown in the shaded fields in FIG. 3). The IP quint is then compared to each entry in the selector table. The co-processor's ternary storage capability permits a "mask" to be applied across chosen bit values in a given selector: thus, for instance, an IPQ search can easily be directed to data packets that have source and destination IP addresses in the same domain, even if the full IP addresses do not match. Only 104 bits of the available 144 bits need be used in an IPQ search, however other header fields can be placed in the spare 40 bits (for instance, TCP flags).

Consider an IP co-processor that can perform 100 million look-ups per second, using all 65,536 144-bit selectors. At STM-64, the maximum UDP or TCP data packet rate is 36 Mdata packets/s (ie with a minimum data packet size of 28 bytes, plus 8 bytes of POS frame overhead). Therefore, a single IP co-processor can handle IP quint searching at rates characteristic of STM-64 almost three times over, even in the worst case: the "worst case" corresponding to the smallest data packet size.

Matching a bit pattern that may appear at any position within an entire IP data packet (payload or header) or even across a data packet boundary has different requirements. For the same IP co-processor, storing entries 144 bits long, each entry corresponds to 18 bytes of data, i.e. 18 characters represented in ASCII (or 9 characters of a language represented in Unicode, such as Chinese). Longer words or e-mail addresses need to be truncated so that the hardware reduces the hit rate to the level where it can be handled easily in software. Text matching involves heavier loading on the co-processor, and some trade-offs are required to achieve the required volumetrics. As will be seen, there is an important trade-off between speed of searching and selector table size. The issues are further described below.

Free text searches require far heavier utilisation than IP quint searching. In the simplest case, an 18-byte window is slid over the data packet, with a comparison every byte against all entries in the selector table (e.g. all e-mail addresses), as shown in FIG. 4. In the IP co-processor used above, 100 million of these comparisons are possible every second; even at STM-16, the byte rate is 311 Mbytes/s, therefore the co-processor is too slow by a factor of three.

Figure 5:
FIG. 5 illustrates a CAM array containing four versions of the same selector with successive byte offsets.

One solution is to perform several searches at once, with successive byte offsets (i.e. eight bit offset), by using spare selectors, with the search term shifted along by a byte each time (at the expense of the available selector length). This is shown in FIG. 5.

Using four selectors for each search term allows a single IP co-processor to handle an STM-16 (311/4=77.75<100), with enough spare capacity for 2-3 searches on IP quint in addition, whilst still providing a large enough selector table size and individual selector length. Here, the speed of searching is maintained at the expense of the number of possible selectors.

More IP co-processors can be brought in to extend the number of selectors that could be searched: each additional co-processor maintaining a different selector table. The speed of searching and the number of possible selectors are both then maintained at the expense of added complexity and the need for additional components.

Figure 6:
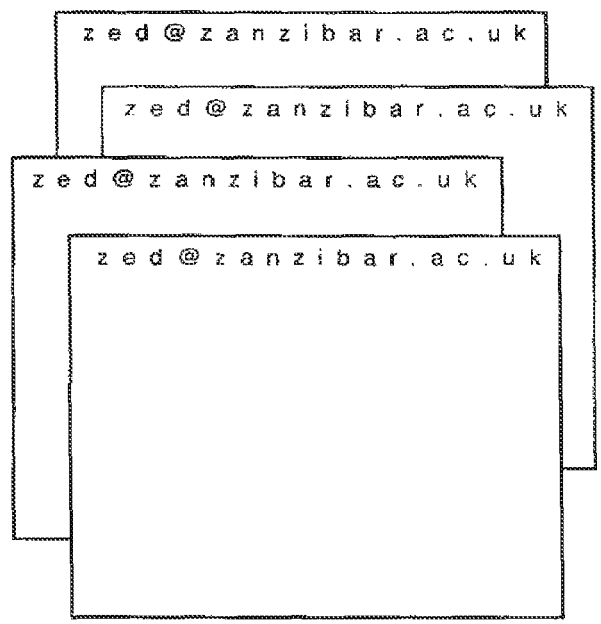
FIG. 6 illustrates four different CAM arrays (belonging to four different search engine logics) each containing one version of the same selector.

Additional co-processors can also be used in an alternative solution. FIG. 6 illustrates a scenario where four IP co-processors are provided, each with their own copy of the same selector table, and where each of the four co-processors is supplied with data packets having differing offsets relative to each other. As noted above, this amounts to the substantially simultaneous processing of the same data structure against four byte-offset selectors.

Pattern matching across data packet boundaries presents a particular problem. Where cross-packet matching is considered necessary, initial free form patterns are sent to software to be divided into two shorter subpatterns. The subpatterns are both written to the memory array of the IP co-processor as selectors. The predetermined bit patterns are generally of a length, L bits, that is shorter than the data packets being searched. Since the predetermined bit pattern will be split across no more than two data packets, at least one of the two subpatterns will be intact in one or other of the two data packets. Both shorter patterns must therefore be searched on to ensure that instances of the full bit pattern split over two data packets are always detected. Where no match is found for the whole predetermined bit pattern and either subpattern matches a bit pattern from the middle of a data packet, it can safely be assumed that the subpattern match is a false match. The IP co-processor thus restricts the pattern searching for the subpatterns of the predetermined bit pattern to bit patterns at either the start or the end of the searched packet: i.e. less than L bits from the first or last bit in each packet.

FIG. 8 illustrates how the apparatus operates in the detection of a virus signature in IP data traffic. The signature of a virus could be anywhere within the IP payloads of one or more data packets passing through the network. The virus signature is therefore searched for in a free form bit pattern search. The bit pattern corresponding to the virus signature is written as a selector onto the CAM array of the IP co-processor.

The incoming data traffic is written at full line rate into both the delay buffer 208 and the register of the IP co-processor 210. The data structure stored in the register is compared with the stored virus signature (step 802): if a match is made, the data packet containing the match (and only that data packet) is passed quickly to software (steps marked by dashed outline, 810). Further inspection then takes place in software.

Since the signature is likely to be only a part of a virus, the software initiates an IPQ search to select other data packets associated with the signature-containing IP data packet, whereby a full IP stream may be isolated from the data path. The IPQ search is initiated by deducing the IP header information that is associated with the IP stream containing the virus signature (step 814), and then writing an entry corresponding to that IP header information to the CAM array of the IP co-processor 210 (step 816). The IP co-processor 210 will then perform an IPQ search of data stored on the delay buffer 208 (step 804) as that data exits at one of the delay outputs 216.

What then happens to IPQ search hits (step 818) would depend on the service being run-in an AV role, the IP stream would be suppressed or discarded-in a network monitoring role, the IP stream might be passed to the software for further analysis (e.g. passed back to the sender) and storage.

The virus signature may not be detected in a given data packet. In which case the data packet will be allowed to pass (step 820). Such data packets, though they do not themselves contain the virus signature, may yet be part of an IP stream that does contain a virus signature. The copy of such a data packet will still be present on the delay buffer 208, so the second (IPQ) search (step 804) will be able to intercept it at one of the delay outputs 216. No further action is needed if the data packet is determined to be free of the virus signature and unrelated to any IP stream that does contain a signature (the data packet will simply be discarded (step 830)). Of course, many further searches may be applied to that data packet (step 820) by the IP co-processor.

Note that the architecture proposed has allowed an 'in-data packet' virus detection to be performed at full line rate, without attempting to process every byte of data traffic in software (which is prohibitive at high data rates).

The FF and IPQ search operations can thus be combined to give highly flexible functionality. The hardware component of the system performs combinations of these searches, at various points on the delay path (216, in FIG. 2), as tasked by the control software component. The control software component is also solely responsible for adding and subtracting selectors to/from the IP co-processor.

The preferred operation of the control software component with respect to selectors is now set out in more detail. Initially, a list of bit patterns and/or TCP/IP headers is read in to a software application, either from a file (that could be in binary, hex, or ASCII format), or from a user interface.

Adding a selector to the IP co-processor, as might occur once a particular IP stream was identified as containing a matched bit pattern for instance, is relatively simple. The software application maintains a table of unused entries in the IP co-processor. For each new bit pattern, the next available free entry in the CAM array is chosen. The bit pattern together with the entry is written across the cPCI bus to the line card, which writes the bit pattern to the IP co-processor (this can be done in two write cycles of 9 bytes each, say), and marks it as active in the IP co-processor.

When a match occurs, the IP co-processor returns the index of the match, which enables the software application to correlate the match with the bit pattern that caused it.

Subtracting a selector from the IP co-processor is also straightforward. To detask a bit pattern, effectively deleting it, the software application simply identifies the CAM entry corresponding to the pattern to be detasked, and (via the cPCI bus and line card firmware) marks that entry as inactive in the IP co-processor. Again, this can be initiated from a user interface or from a tasking file.

Placing all of the complexity in the software has a number of advantages. Firstly, new or enhanced protocol support can be implemented and integrated far more easily. Furthermore, for scenarios where several units need to be deployed (either across the cPCI backplane, or with LAN/WAN links), and where relevant data packets can arrive at any of the interfaces, the processing needs be distributed and hence done in software. VoIP "go and return" paths is an example of this.

Preferred embodiments combine many aspects of the invention: header/data packet searches, delay buffer, software control, and remote tasking. In consequence, they enable support for any IP-based protocol to be added easily: for example, VoIP (multiple session reconstruction, text and binary searching); IP usage statistics (survey functionality); and e-mail (intensive text searching).

The firmware processing logic will provide a few auxiliary services, such as data packet counting.

Although the preceding discussion deals mainly with an embodiment of the apparatus for detecting bit patterns in IP traffic, the present invention is not limited to handling IP data traffic. Indeed, a similar architecture to that illustrated in FIG. 2 allows real-time processing of a variety of complex data packetized protocols without the need for development of complex hardware or firmware. Examples of complex protocols to which this architecture can be applied include: the TCP/IP protocol family (including RTP, UDP and ICMP); ATM; X.25; NetBEUI; and DECNET.

In the example shown in FIG. 9, the hardware interception and filtering apparatus of the present invention is implemented as a cPCI processing card 902,904 for slotting into a cPCI backbone (bus) 920. The separate software subsystem, where matching data packets are sent for more detailed analysis, is implemented as a single board computer 910 that also slots into the cPCI backbone 920. The computer may conveniently be based upon the x86 family of processors and may run an off-the-shelf operating system, such as Microsoft Windows®. The illustrated system has two cPCI processing cards 902,904 that are controlled from the single board computer 910. In practice, there can be an arbitrary, many-to-many relationship. For example, if a high percentage of the raw traffic must be processed in software, then several PCs can service a single interception card, with the on-board firmware (the processing logic) balancing the load between the PCs. Conversely, if the hit rate of 'dangerous' data packets in hardware is low, then a single PC can task and control many processing cards, reducing the total system cost.

For passive, data packet sniffing applications, the wanted 'target' data packets are output from the software running on the single board computer. For active, streaming applications, such as real-time AV, the 'safe' data packets are forwarded directly from the processing card—this path is not, however, shown in the Figure.

In one embodiment of the present invention, the apparatus is installed centrally, in a network core. When applied centrally, the ability to monitor data packets in real-time in order to identify undesirable, dangerous or illicit content (for instance, unsolicited advertisements, computer viruses, or pornography) for a large number of subscribers allows service providers to offer a brand new service to their subscribers: a "clean internet service". Unlike prior art internet services where the data traffic has to be "cleaned" after data has entered the customer's premises, a clean internet service could be configured to remove all the undesirable, dangerous or illicit content before it reaches the customer's premises.

What is claimed is:

1. An apparatus for analyzing data streams comprising data packets formed according to a predetermined data transfer protocol, the apparatus comprising:
   a network transceiver which receives one or more data streams being conveyed over a network;
   a bit sequence storage memory array which stores one or more predetermined bit sequences to be recognized in a received data stream;
   a hardware search engine logic coupled to the network transceiver and with access to the bit sequence storage memory array, configured to perform a bit-wise comparison of a bit sequence stored in the bit sequence storage memory array with data in the one or more received data stream;
   a delay buffer, coupled to the network transceiver, having a plurality of outputs for outputting the one or more received data streams with different respective lengths of delay; and
   a software application coupled to the delay buffer and configured to receive data packets in the one or more received data streams from one or more of said plurality of outputs,
   wherein the software application is triggered, in the event that the hardware search engine logic recognizes a stored bit sequence in one or more data packets of a given received data stream, to perform further processing on data packets of the given data stream being output from the delay buffer with a first level of delay, to at least identify the given data stream, and
   wherein the software application is further triggered, in dependence upon a result of said further processing, to perform one or more further stages of processing on data packets of the given data stream being output from the delay buffer at one or more of said plurality of outputs, the further processed data packets including one or more packets belonging to a same data stream which was identified.

2. The apparatus as in claim 1, wherein the software application is provided with access to the bit sequence memory array to store one or more different bit sequences, generated as a result of said further processing or said one or more further stages of processing, for use by the hardware search engine logic.

3. The apparatus as in claim 1, wherein at least one of the one or more predetermined bit sequences comprises two sub-patterns, each sub-pattern being stored as a separate bit sequence entry in the bit sequence storage memory array; and wherein the hardware search engine logic is configured to compare the two sub-patterns with bit sequences contained in each data packet of the one or more received data streams and to identify each data packet that contains a bit sequence that matches one of the two sub-patterns.

4. The apparatus as in claim 1, wherein the software application performs a protocol based search in which data packets in the one or more received data streams are identified by virtue of a recognized bit sequence occurring in at least one data field within each data packet.

5. The apparatus as in claim 4, wherein the at least one data field is a header field, the header field comprising data relating to one or more of the group including:
   address information;
   to/from port number information; and
   data packet type identifier information.

6. The apparatus as in claim 1, wherein the bit sequence storage memory array comprises a plurality of bit offset entries corresponding to one or more predetermined bit sequences.

7. The apparatus as in claim 6, further comprising at least one other hardware search engine logic, wherein each of the at least one other hardware search engine logic is configured to operate upon another bit sequence having a different predetermined offset relative to the bit sequence operated upon by the hardware search engine logic.

8. The apparatus as in claim 7, wherein each of the at least one other hardware search engine logic is provided with access to an identical copy of contents of the bit sequence storage memory array.

9. The apparatus as in claim 1, wherein the predetermined data transfer protocol is the internet protocol (IP) and wherein the hardware search engine logic and the bit sequence storage memory array are implemented by means of one or more IP coprocessors.

10. A method for analyzing data streams comprising data packets formed according to a predetermined data transfer protocol, the method comprising:
   (a) receiving one or more data streams being conveyed over a network;
   (b) performing, by a hardware search engine logic coupled to the network, a bit-wise comparison of a predetermined bit sequence with data in the received one or more data streams to thereby identify a target data stream;
   (c) passing the one or more received data streams through a delay buffer having a plurality of outputs to thereby impart a plurality of different delays to data packets in the one or more received data streams;
   (d) upon identifying a target data stream at operation (b), triggering a software application to perform further processing on data packets of the target data stream being output from the delay buffer with a first level of delay, to at least identify a given data stream; and
   (e) in dependence upon a result of said further processing carried out at operation (d), triggering one or more further stages of processing by the software application on data packets of the target data stream when output from the delay buffer at one or more of said plurality of outputs, the further processed data packets including one or more packets belonging to a same data stream which was identified.

11. The method of claim 10, wherein at the operation (e) the one or more further stages of processing are carried out on the same data packets of the target data stream as those subjected to further processing at the operation (d).

12. The method of claim 10, further comprising:
   (f) in dependence upon the results of the further processing at the operation
   (d) or the one or more further stages of processing at the operation (e), generating a different predetermined bit sequence for use at the operation (b).

13. An apparatus for analyzing data streams comprising data packets formed according to a predetermined data transfer protocol, the apparatus comprising:
   a network transceiver which receives a data stream being conveyed over the network;
   a bit sequence storage memory array which stores one or more predetermined bit sequences to be recognized in the received data stream;
   a hardware search engine logic coupled to the network transceiver and with access to the bit sequence storage memory array, for performing a bit-wise comparison of a bit sequence stored in the bit sequence memory array with data in the received data stream to thereby identify one or more target data packets;
   a computer, coupled to the hardware search engine logic, configured to execute a software application for performing further analysis on target data packets identified by the hardware search engine logic, and
   a delay buffer coupled to the network transceiver, having a plurality of outputs for outputting the received data stream with different respective lengths of delay,
   wherein the computer is configured to receive target data packets from one or more of said plurality of outputs for processing by the software application, and
   where the software application is triggered to perform further processing on target data packets being output from the delay buffer with a first level of delay, to at least identify a given data stream and, in dependence upon a result of said further processing, to perform one or more further stages of processing on the same or different target data packets being output from the delay buffer at one or more of said plurality of outputs, the further processed data packets including one or more packets belonging to a same data stream which was identified.

14. The apparatus as in claim 13, wherein the software application is provided with access to the bit sequence memory array to store one or more different bit sequences, generated as a result of said further processing or said one or more further stages of processing, for use by the hardware search engine logic in identifying one or more further target data packets.

* * * * *